Figure 1:
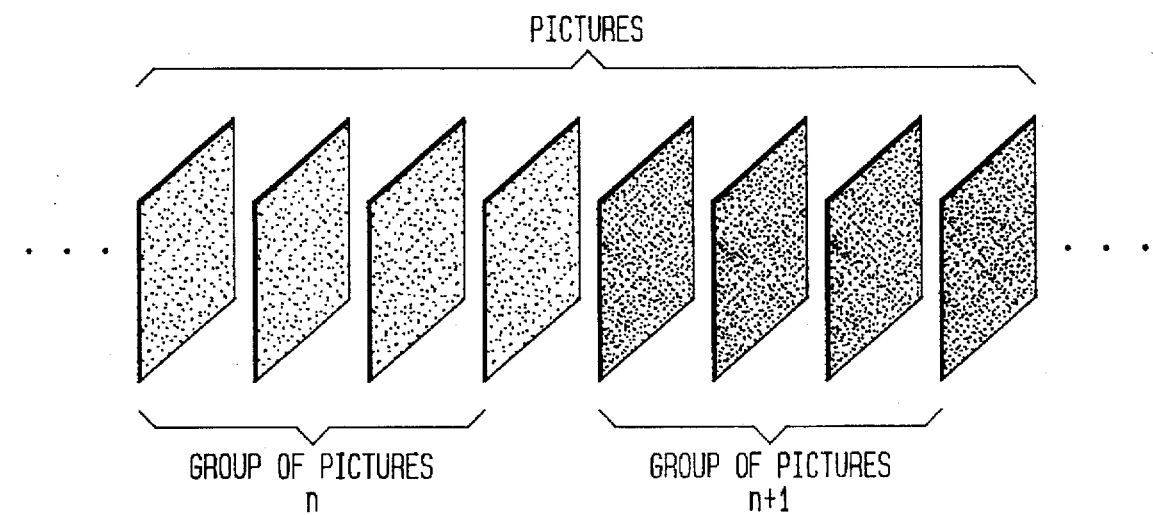

United States Patent [19]
Linzer

[11] Patent Number: 5,737,023
[45] Date of Patent: Apr. 7, 1998

[54] HIERARCHICAL MOTION ESTIMATION FOR INTERLACED VIDEO

[75] Inventor: Elliot Neil Linzer, Bronx, N.Y.

[73] Assignee: International Business Machines Corporation, Armonk, N.Y.

[21] Appl. No.: 596,933

[22] Filed: Feb. 5, 1996

[51] Int. Cl.[6] .................................................. H04N 7/36
[52] U.S. Cl. ........................................ 348/416; 348/399
[58] Field of Search ...................................... 348/384, 390, 348/392, 399, 401, 402, 409, 411, 412, 413, 415, 416, 424, 425; 382/236, 238

[56] References Cited

U.S. PATENT DOCUMENTS

| | | | |
|---|---|---|---|
| 5,134,478 | 7/1992 | Golin | 348/415 |
| 5,193,003 | 3/1993 | Kondo | 348/424 |
| 5,270,813 | 12/1993 | Puri et al. | 348/415 |
| 5,436,665 | 7/1995 | Ueno et al. | 348/425 |
| 5,463,422 | 10/1995 | Simpson et al. | 348/425 |
| 5,565,922 | 10/1996 | Krause | 348/413 |

Primary Examiner—Amelia Au
Attorney, Agent, or Firm—Scully, Scott, Murphy & Presser

[57] ABSTRACT

A system and method for performing motion estimation. Interlaced frames are reduced in resolution using field based scaling, and a first search is performed on the reduced resolution frames. This first search is performed by computing motion errors between the fields of a current frame and the fields of a reference frame to obtain vectors that approximately describe inter-field motion. These same motion errors are used to compute frame errors, which are used to obtain vectors that approximately describe inter-frame motion. The approximate field and frame vectors are then refined to get more precise vectors.

14 Claims, 10 Drawing Sheets

- - - - - - - - - - - - COLUMN X - - - - - - - - - - - - - -
- - - - - - - - - - - - COLUMN W - - - - - - - - - - - - - -
- - - - - - - - - - - - COLUMN V - - - - - - - - - - - - - -
- - - - - - - - - - - - COLUMN U - - - - - - - - - - - - - -
- - - - - - - - - - - - COLUMN T - - - - - - - - - - - - - -
- - - - - - - - - - - - COLUMN S - - - - - - - - - - - - - -
- - - - - - - - - - - - COLUMN R - - - - - - - - - - - - - -
- - - - - - - - - - - - COLUMN Q - - - - - - - - - - - - - -
- - - - - - - - - - - - COLUMN P - - - - - - - - - - - - - -
- - - - - - - - - - - - COLUMN O - - - - - - - - - - - - - -
- - - - - - - - - - - - COLUMN N - - - - - - - - - - - - - -
- - - - - - - - - - - - COLUMN M - - - - - - - - - - - - - -
- - - - - - - - - - - - COLUMN L - - - - - - - - - - - - - -
- - - - - - - - - - - - COLUMN K - - - - - - - - - - - - - -
- - - - - - - - - - - - COLUMN J - - - - - - - - - - - - - -
- - - - - - - - - - - - COLUMN I - - - - - - - - - - - - - -
- - - - - - - - - - - - COLUMN H - - - - - - - - - - - - - -
- - - - - - - - - - - - COLUMN G - - - - - - - - - - - - - -
- - - - - - - - - - - - COLUMN F - - - - - - - - - - - - - -
- - - - - - - - - - - - COLUMN E - - - - - - - - - - - - - -
- - - - - - - - - - - - COLUMN D - - - - - - - - - - - - - -
- - - - - - - - - - - - COLUMN C - - - - - - - - - - - - - -
- - - - - - - - - - - - COLUMN B - - - - - - - - - - - - - -
- - - - - - - - - - - - COLUMN A - - - - - - - - - - - - - -

FIG. 8A

```
TOP ---------------------- LINE A ----------------------
BOT ---------------------- LINE B ----------------------
TOP ---------------------- LINE C ----------------------
BOT ---------------------- LINE D ----------------------
TOP ---------------------- LINE E ----------------------
BOT ---------------------- LINE F ----------------------
TOP ---------------------- LINE G ----------------------
BOT ---------------------- LINE H ----------------------
TOP ---------------------- LINE I ----------------------
BOT ---------------------- LINE J ----------------------
TOP ---------------------- LINE K ----------------------
BOT ---------------------- LINE L ----------------------
TOP ---------------------- LINE M ----------------------
BOT ---------------------- LINE N ----------------------
TOP ---------------------- LINE O ----------------------
BOT ---------------------- LINE P ----------------------
TOP ---------------------- LINE Q ----------------------
BOT ---------------------- LINE R ----------------------
TOP ---------------------- LINE S ----------------------
BOT ---------------------- LINE T ----------------------
TOP ---------------------- LINE U ----------------------
BOT ---------------------- LINE V ----------------------
TOP ---------------------- LINE W ----------------------
BOT ---------------------- LINE X ----------------------
```

FIG. 8B

```
TOP ---------- AVERAGE OF LINES A AND C ----------
BOT ---------- AVERAGE OF LINES B AND D ----------
TOP ---------- AVERAGE OF LINES E AND G ----------
BOT ---------- AVERAGE OF LINES F AND H ----------
TOP ---------- AVERAGE OF LINES I AND K ----------
BOT ---------- AVERAGE OF LINES J AND L ----------
TOP ---------- AVERAGE OF LINES M AND O ----------
BOT ---------- AVERAGE OF LINES N AND P ----------
TOP ---------- AVERAGE OF LINES R AND T ----------
BOT ---------- AVERAGE OF LINES Q AND S ----------
TOP ---------- AVERAGE OF LINES V AND X ----------
BOT ---------- AVERAGE OF LINES U AND W ----------
```

FIG. 9A

| | | | | | | | | | |
|---|---|---|---|---|---|---|---|---|---|
| A0_0 | A0_1 | A0_2 | A0_3 | A0_4 | A0_5 | A0_6 | A0_7 | A0_8 | A0_9 |
| A1_0 | A1_1 | A1_2 | A1_3 | A1_4 | A1_5 | A1_6 | A1_7 | A1_8 | A1_9 |
| A2_0 | A2_1 | A2_2 | A2_3 | A2_4 | A2_5 | A2_6 | A2_7 | A2_8 | A2_9 |
| A3_0 | A3_1 | A3_2 | A3_3 | A3_4 | A3_5 | A3_6 | A3_7 | A3_8 | A3_9 |
| A4_0 | A4_1 | A4_2 | A4_3 | A4_4 | A4_5 | A4_6 | A4_7 | A4_8 | A4_9 |
| A5_0 | A5_1 | A5_2 | A5_3 | A5_4 | A5_5 | A5_6 | A5_7 | A5_8 | A5_9 |
| A6_0 | A6_1 | A6_2 | A6_3 | A6_4 | A6_5 | A6_6 | A6_7 | A6_8 | A6_9 |
| A7_0 | A7_1 | A7_2 | A7_3 | A7_4 | A7_5 | A7_6 | A7_7 | A7_8 | A7_9 |
| A8_0 | A8_1 | A8_2 | A8_3 | A8_4 | A8_5 | A8_6 | A8_7 | A8_8 | A8_9 |
| A9_0 | A9_1 | A9_2 | A9_3 | A9_4 | A9_5 | A9_6 | A9_7 | A9_8 | A9_9 |

FIG. 9B

| | | | | | | | |
|---|---|---|---|---|---|---|---|
| B0_0 | B0_1 | B0_2 | B0_3 | B0_4 | B0_5 | B0_6 | B0_7 |
| B1_0 | B1_1 | B1_2 | B1_3 | B1_4 | B1_5 | B1_6 | B1_7 |
| B2_0 | B2_1 | B2_2 | B2_3 | B2_4 | B2_5 | B2_6 | B2_7 |
| B3_0 | B3_1 | B3_2 | B3_3 | B3_4 | B3_5 | B3_6 | B3_7 |
| B4_0 | B4_1 | B4_2 | B4_3 | B4_4 | B4_5 | B4_6 | B4_7 |
| B5_0 | B5_1 | B5_2 | B5_3 | B5_4 | B5_5 | B5_6 | B5_7 |
| B6_0 | B6_1 | B6_2 | B6_3 | B6_4 | B6_5 | B6_6 | B6_7 |
| B7_0 | B7_1 | B7_2 | B7_3 | B7_4 | B7_5 | B7_6 | B7_7 |

FIG. 10A

| | | | | | | | | | |
|---|---|---|---|---|---|---|---|---|---|
| A0_0 | A0_1 | A0_2 | A0_3 | A0_4 | A0_5 | A0_6 | A0_7 | A0_8 | A0_9 |
| A2_0 | A2_1 | A2_2 | A2_3 | A2_4 | A2_5 | A2_6 | A2_7 | A2_8 | A2_9 |
| A4_0 | A4_1 | A4_2 | A4_3 | A4_4 | A4_5 | A4_6 | A4_7 | A4_8 | A4_9 |
| A6_0 | A6_1 | A6_2 | A6_3 | A6_4 | A6_5 | A6_6 | A6_7 | A6_8 | A6_9 |
| A8_0 | A8_1 | A8_2 | A8_3 | A8_4 | A8_5 | A8_6 | A8_7 | A8_8 | A8_9 |

FIG. 10B

| | | | | | | | | | |
|---|---|---|---|---|---|---|---|---|---|
| A1_0 | A1_1 | A1_2 | A1_3 | A1_4 | A1_5 | A1_6 | A1_7 | A1_8 | A1_9 |
| A3_0 | A3_1 | A3_2 | A3_3 | A3_4 | A3_5 | A3_6 | A3_7 | A3_8 | A3_9 |
| A5_0 | A5_1 | A5_2 | A5_3 | A5_4 | A5_5 | A5_6 | A5_7 | A5_8 | A5_9 |
| A7_0 | A7_1 | A7_2 | A7_3 | A7_4 | A7_5 | A7_6 | A7_7 | A7_8 | A7_9 |
| A9_0 | A9_1 | A9_2 | A9_3 | A9_4 | A9_5 | A9_6 | A9_7 | A9_8 | A9_9 |

FIG. 10C

| | | | | | | | |
|---|---|---|---|---|---|---|---|
| B0_0 | B0_1 | B0_2 | B0_3 | B0_4 | B0_5 | B0_6 | B0_7 |
| B2_0 | B2_1 | B2_2 | B2_3 | B2_4 | B2_5 | B2_6 | B2_7 |
| B4_0 | B4_1 | B4_2 | B4_3 | B4_4 | B4_5 | B4_6 | B4_7 |
| B6_0 | B6_1 | B6_2 | B6_3 | B6_4 | B6_5 | B6_6 | B6_7 |

FIG. 10D

| | | | | | | | |
|---|---|---|---|---|---|---|---|
| B1_0 | B1_1 | B1_2 | B1_3 | B1_4 | B1_5 | B1_6 | B1_7 |
| B3_0 | B3_1 | B3_2 | B3_3 | B3_4 | B3_5 | B3_6 | B3_7 |
| B5_0 | B5_1 | B5_2 | B5_3 | B5_4 | B5_5 | B5_6 | B5_7 |
| B7_0 | B7_1 | B7_2 | B7_3 | B7_4 | B7_5 | B7_6 | B7_7 | ctions
HIERARCHICAL MOTION ESTIMATION FOR INTERLACED VIDEO

I. BACKGROUND OF THE INVENTION a. Field of the Invention

The present invention relates to the field of data compression and, more particularly, to a system and method for compressing digital motion video signals.

b. Related Art

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks as well as broadcast terrestrially and over direct broadcast satellites; and in interactive multimedia products on CDROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. The standard specifies the syntax of the compressed bit stream and the method of decoding, but leave considerable latitude for novelty and variety in the algorithm employed in the encoder.

Both the MPEG-1 and MPEG-2 algorithms can be described as hybrid transform encoding/motion compensation encoders. For an encoder to efficiently use motion compensation, it typically must perform a task called motion estimation.

Motion estimation can be described in general terms as deciding where a particular region in a picture "came from" in a picture or pictures that occur temporally earlier or later in time and deciding how accurately a region of the current picture can be said to "come from" other pictures.

Motion estimation is one of the most computationally intensive tasks that an MPEG-2 encoder performs. Thus, an important consideration in building an MPEG-2 encoder is to use an economical motion estimation scheme.

II. SUMMARY OF THE INVENTION

The present invention involves a system and method for performing motion estimation. Interlaced frames are reduced in resolution by using field based scaling, and a first search is performed on the reduced resolution frames. This first search is performed by computing motion errors between the fields of a current frame and the fields of a reference frame to obtain vectors that approximately describe inter-field motion. These same motion errors are used to compute frame errors, which are used to obtain vectors that approximately describe inter-frame motion. The approximate field and frame vectors are then refined to get more precise vectors.

Advantageously, the present invention can be implemented an encoder suitable for use with the ISO/IEC MPEG-2 standard.

III. BRIEF DESCRIPTION OF THE DRAWINGS

Figure 2:
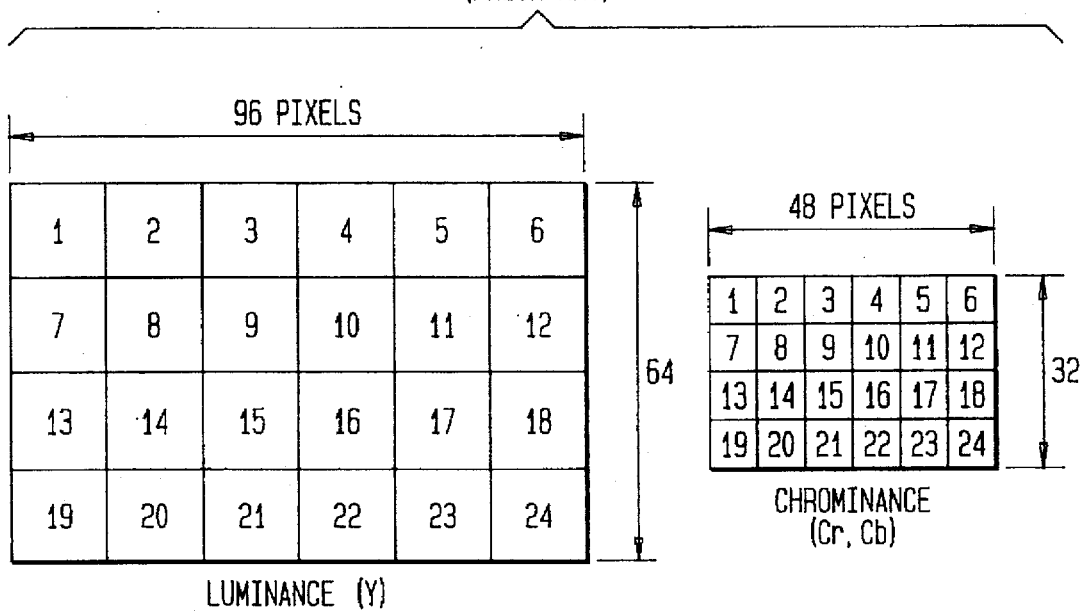
Figure 3:
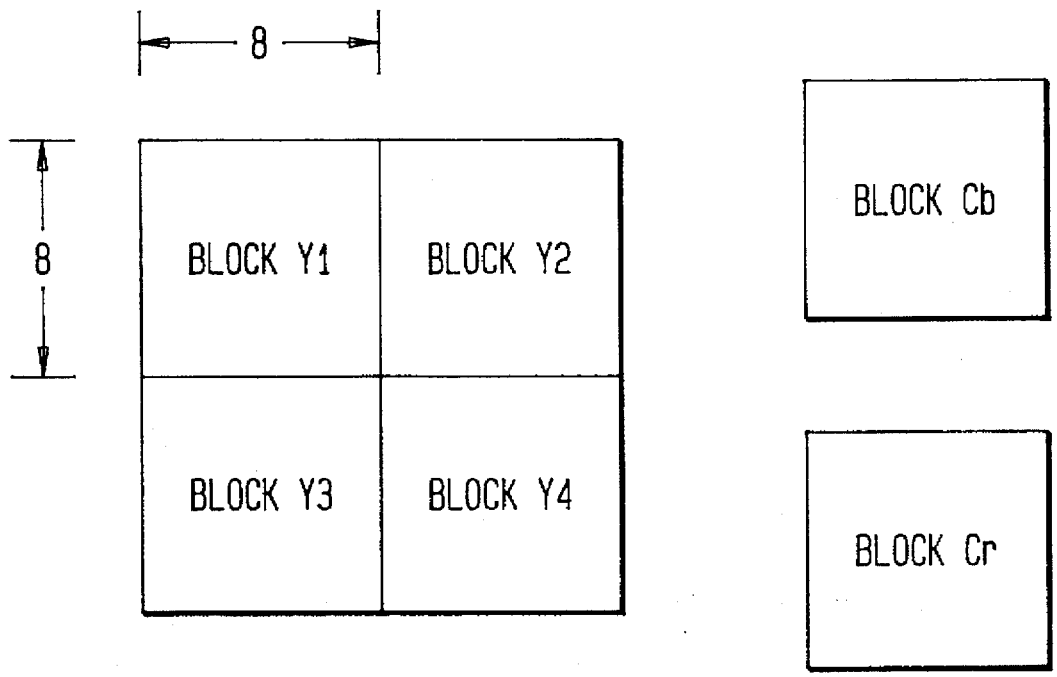
Figure 4:
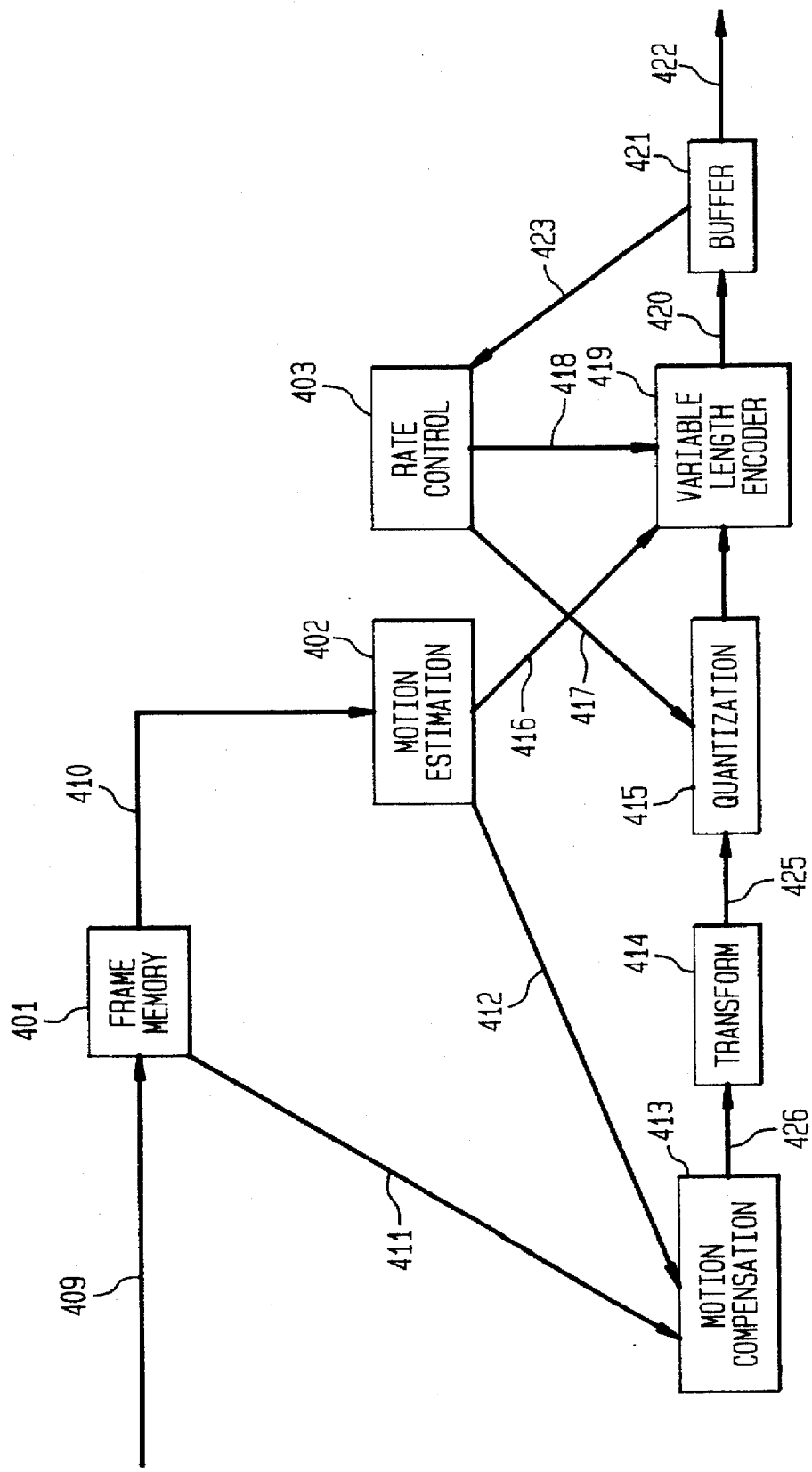
Figure 5:
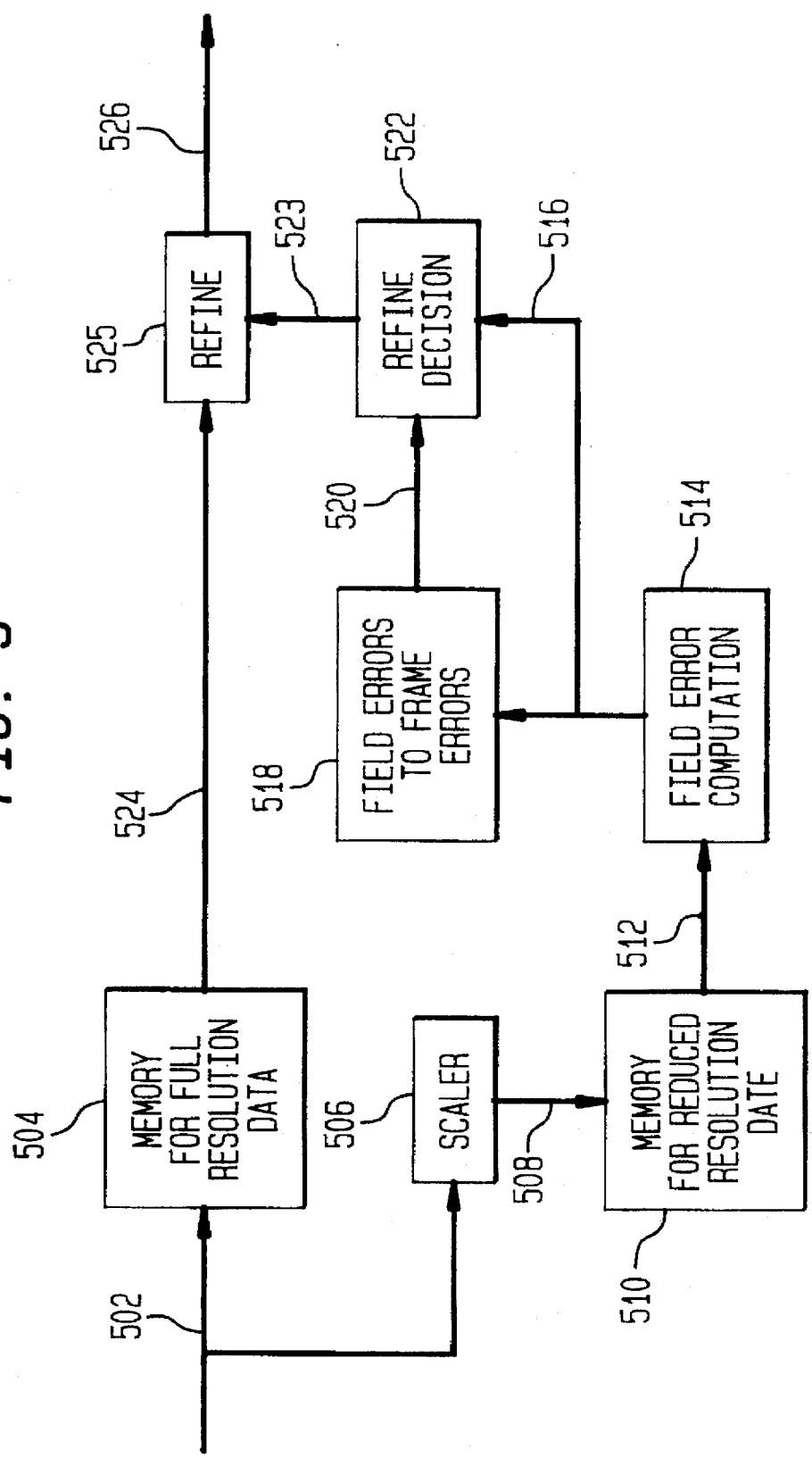
Figure 6:
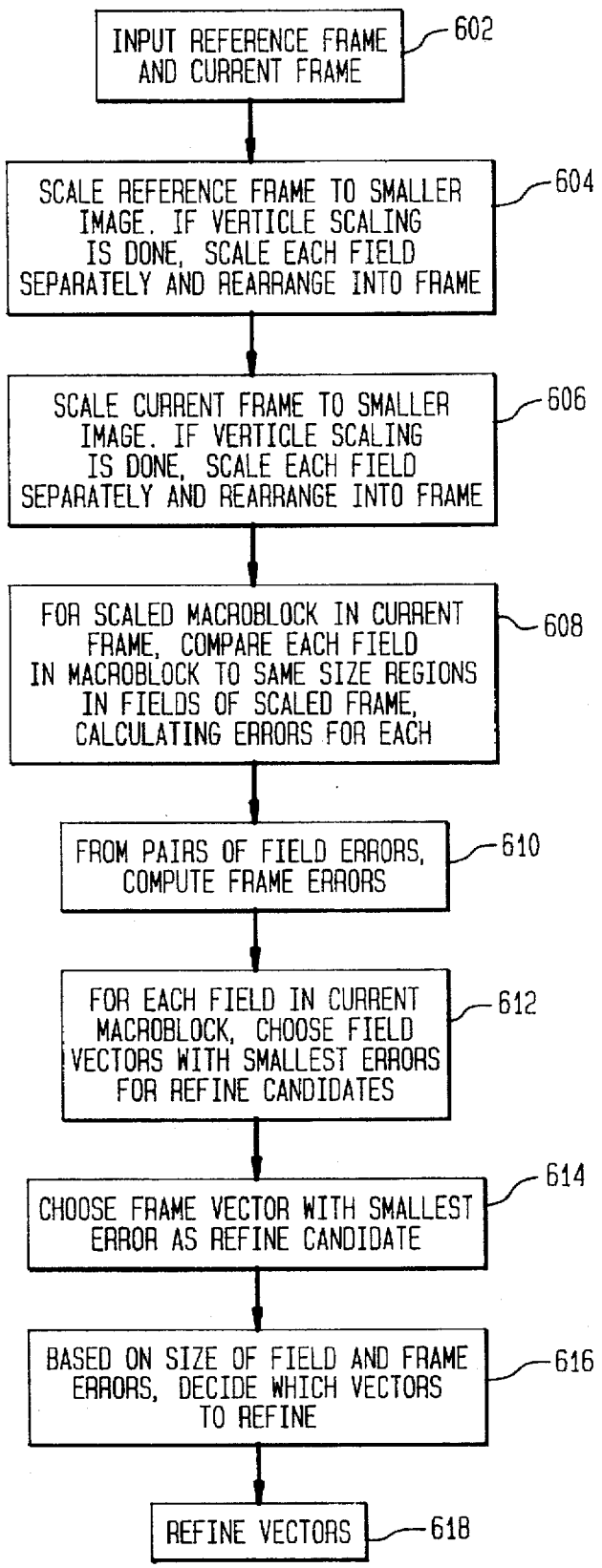
Figure 11:
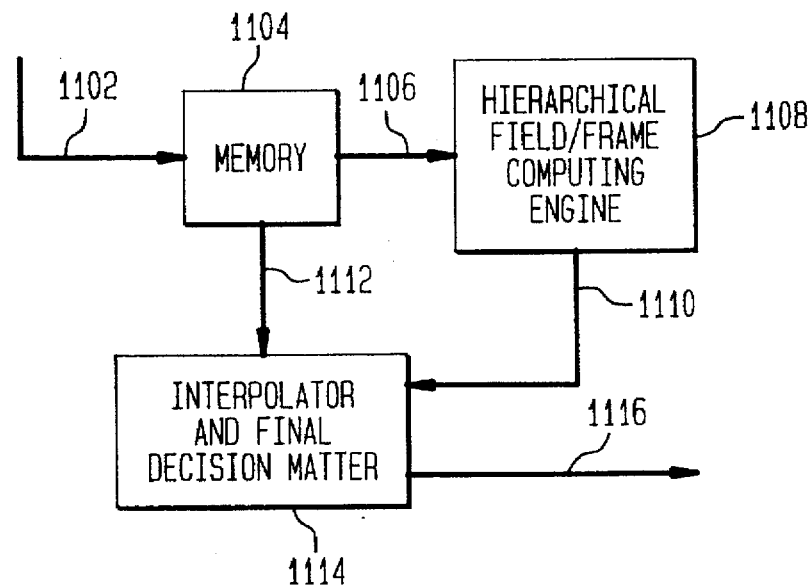
Figure 12:
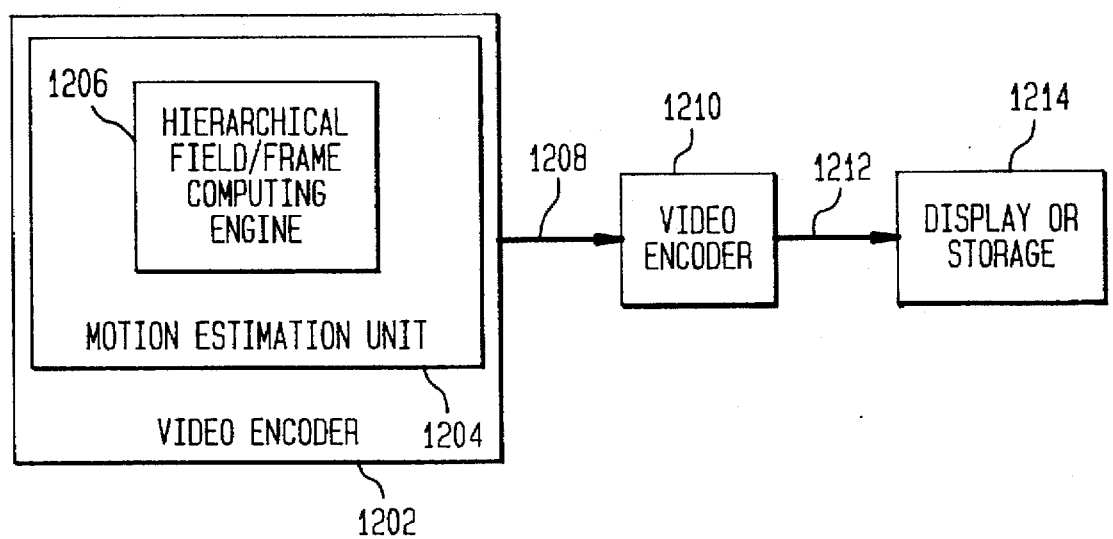

FIG. 1: Exemplary pair of Groups of Pictures (GOP's);

FIG. 2: Exemplary macroblock (MB) subdivision of a picture (for 4:2:0 format);

FIG. 3: Block subdivision of a macroblock (for 4:2:0 format);

FIG. 4: Block diagram of a video encoder;

FIG. 5: Block diagram of the hierarchical field/frame computing engine of FIG. 11;

FIG. 6: Flow chart describing the method of motion estimation in accordance with the principles of the present invention;

FIGS. 7a and 7b: Example of horizontal image scaling in accordance with the principles of the present invention;

FIGS. 8a and 8b: Example of vertical image scaling in accordance with the principles of the present invention;

FIGS. 9a and 9b: Example of reduced resolution frame and macroblock in accordance with the principles of the present invention, shown in frame form;

FIGS. 10a, 10b, 10c and 10d: Example of reduced resolution frame and macroblock in accordance with the principles of the present invention, shown in field form;

FIG. 11: Block diagram of a motion estimation unit according to an embodiment of the present invention;

FIG. 12: Block diagram of an encoder and decoder pair according to an embodiment of the present invention.

IV. DETAILED DESCRIPTION OF THE PREFERRED EMBODIMENTS a. THE MPEG-2 ENVIRONMENT

As the present invention may be applied in connection with an MPEG-2 encoder, in order to facilitate the understanding of the invention, some pertinent aspects of the MPEG-2 compression algorithm will be reviewed. It is to be noted, however, that the invention can also be applied to other video coding algorithms which share some of the features of the MPEG algorithms.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2. Although, as mentioned, the MPEG-2 standard is really a specification of the decoder and the compressed bit stream syntax, the following description of the MPEG-2 specification is, for ease of presentation, primarily from an encoder point of view.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or noninterlaced component video. Each picture has three components: luminance (Y), red color difference ($C_r$), and blue color difference ($C_b$). The video data may be coded in 4:4:4 format, in which case there is one $C_r$ and one $C_b$ sample for each Y sample, in 4:2:2 format, in which case there are half as many $C_r$ and $C_b$ samples as luminance samples in the horizontal direction, or in 4:2:0 format, in which case there are half as many $C_r$ and $C_b$ samples as luminance samples in both the horizontal and vertical directions.

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1–3. The layers pertain to the operation of the compression algorithm as well as the composition of a compressed bit stream. The highest layer is the video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOP's. There is no limit to the number of pictures which may be in a GOP, nor do there have to be equal numbers of pictures in all GOP's.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a frame-structured picture contains information for C×R pixels and a field-structured picture contains information for C×R/2 pixels.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called anchor pictures.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantising the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantisation of the DCT coefficients, is the primary source of lossiness in the MPEG-2 algorithm. Denoting the elements of the two-dimensional array of DCT coefficients by $c_{mn}$, where m and n can range from 0 to 7, aside from truncation or rounding corrections, quantisation is achieved by dividing each DCT coefficient $c_{mn}$ by $w_{mn}$ times QP, with $w_{mn}$ being a weighting factor and QP being the quantiser parameter. The weighting factor $w_{mn}$ allows coarser quantisation to be applied to the less visually significant coefficients. The quantiser parameter QP is the primary means of trading off quality vs. bit-rate in MPEG-2. It is important to note that QP can vary from MB to MB within a picture.

Following quantisation, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy prior to coding a picture is "motion compensation". MPEG-2 provides tools for several methods of motion compensation (described below).

Many methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type (I, P, or B) and structure (field or frame) of a picture determine the methods of motion compensation that can be used. The encoder chooses from among these methods for each macroblock in the picture. The encoder also selects which motion vectors to use with the selected motion compensation method for each macroblock. This process is referred to as motion estimation. In its preferred embodiment, the present invention deals with motion estimation for frame-structured pictures. The motion compensation methods for frame-structured pictures are now described.

A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, frame (FR) or field (FI) motion compensation modes can be used. (In some cases, another mode (dual prime) can also be used. Motion estimation methods for dual prime are not an object of the present invention, so we do not describe dual prime motion compensation). We refer to the combination of macroblock mode and motion compensation mode used by a macroblock as the motion compensation "method"; there are six such methods: F/FR, B/FR, FB/FR, F/FI, B/FI, FB/FI. These methods will all be described below.

A macroblock in any picture can be compressed with I macroblock mode. This is the only macroblock mode available in an I picture, and does not use motion compensation.

F macroblock mode can be used in a P or B picture but not in an I picture. When F macroblock mode is used, the predictive macroblock is formed from the most recently decoded top and bottom fields from anchor pictures that are to be displayed before the current picture (the previous anchor frame).

B or FB macroblock mode can be used in a B picture but not in I or P pictures. When B macroblock mode is used, the predictive macroblock is formed from the two most recently decoded anchor fields that are to be displayed after the current picture (the future anchor frame). When FB macroblock mode is used, the predictive macroblock is formed from the future anchor frame and the previous anchor frame.

The method of motion compensation that uses F macroblock mode and FR motion compensation mode (F/FR) can be described as follows. The encoder sends a single vector in the bit stream. This vector is used to generate a set of indices in the previous frame, and the predictive macroblock is the 16×16 region located at those indices. When this method of motion compensation is used, no distinction is made between the two fields; the previous frame and current macroblock are viewed as being single images (not two fields), and the predictive macroblock can start anywhere in the previous frame.

The B/FR method of motion compensation is the same as the F/FR method, except that the future frame, rather than the previous frame, is used in generating the predictive macroblock.

The method of motion compensation that uses F macroblock mode and FI motion compensation mode (F/FI) can be described as follows. The encoder sends two vectors in the bit stream. Each vector is used to form a 16×8 array of pixels from one of the fields in the previous frame. Two bits are sent to indicate which field of the reference frame is to be used with each vector. The predictive macroblock is formed by interleaving these two arrays; the first array provides the odd lines of the predictive macroblock and the second array provides the even lines. (Each array is used for different fields in the predictive macroblock).

The B/FI method of motion compensation is the same as the F/FI method, except that the future frame, rather than the previous frame, is used in generating the predictive macroblock.

The FB/FR method of motion compensation works as follows. The encoder sends two motion vectors, a forward vector and a backward vector. The forward vector is used to construct a macroblock from the previous frame the same way a vector is used to form the predictive macroblock for the F/FR method of motion compensation, and the backward vector is used to construct a macroblock from the future frame the same way a vector is used to form the predictive macroblock for the B/FR method of motion compensation. These two macroblocks are averaged to form the predictive macroblock.

The FB/FI method of motion compensation works as follows. The encoder sends four motion vectors, two forward vectors and two backward vectors. The forward vectors are used to construct a macroblock from the previous frame the same way two vectors are used to form the predictive macroblock for the F/FI method of motion compensation, and the backward vectors are used to construct a macroblock from the future frame the same way two vectors are used to form the predictive macroblock for the B/FI method of motion compensation. These two macroblocks are averaged to form the predictive macroblock.

The vectors sent for any mode of motion compensation can be in half-pixel units. In the case of the F/FR, F/FI, B/FR and B/FI methods of motion compensation, spatial interpolation is used to generate the predictive macroblock when the vectors used are in half-pixel units. In the case of the FB/FR and FB/FI methods, spatial interpolation is used to generate the macroblocks that are averaged to make the predictive macroblock when the vectors used are in half-pixel units.

The encoder performs motion estimation to determine the method of motion compensation and motion vectors to be used. One method that an encoder may use is to examine all legal combinations of vectors and motion compensation methods, calculate an error for each combination, and choose the combination with the smallest error. An example of an error measure is the norm of the difference macroblock that would be used by a particular combination of motion compensation method and motion vectors. Because this method (exhaustive search) is computationally intensive, it is rarely used in practice.

Aside from the need to code side information relating to the MB mode used to code each MB and any motion vectors associated with that mode, the coding of motion-compensated macroblocks is very similar to that of intra-mode MBs. Although there is a small difference in the quantisation, the model of division by $w_{mn}$ times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

In order that the bit stream satisfy the MPEG-2 rate control requirements, all the data for each picture is made available within the buffer at the instant it is needed by the decoder and the buffer never overflows. This availability requirement usually translates to upper and lower bounds on the number of bits allowed in each picture. The upper and lower bounds for a given picture depend on the number of bits used in all the pictures preceding it. It is the function of the encoder to produce bit streams which satisfy this requirement.

FIG. 4 is a block diagram of a simplified view of a conventional MPEG-2 encoder. Because MPEG-2 encoding is generally known in the art, we have not drawn all of the components of an MPEG-2 encoder, but instead concentrated on the major components and those that are needed to understand the aspects of this invention. In particular, we show the following components of an MPEG-2 encoder: frame memory 401, motion estimation unit 402, rate control unit 403, motion compensation unit 413, transformation unit 414, quantisation unit 415, variable length encoder unit 419, and output buffer 421. The input to the video encoder of FIG. 4 is the signal 409, containing the Y, Cb and Cr pixel data. The output is the compressed bit stream 422.

For the encoder of FIG. 4, the input pixel data is stored in the frame memory. The motion estimation unit 402 does motion estimation for each macroblock. In particular, for each macroblock the motion estimation unit decides which motion compensation method will be used and motion vector(s) will be used.

The motion estimation unit sends the motion compensation method and motion vector(s) as signal 412 to the motion compensation unit. This signal, together with pixel data retrieved from the frame memory as signal 411, is used by the motion compensation unit to compute the difference macroblock, which is sent as the signal 426 to the transform unit.

The transform unit segments the difference macroblock (signal 426) into 8×8 blocks and computes the DCT of each block. These are sent as the signal 425 to the quantisation unit 415.

The quantisation unit 415 quantises each DCT coefficient based on the quantisation parameter Qp sent as signal 417 from the rate control unit (described later). These quantised DCT coefficients are sent as the signal 424 to the variable length encoder unit.

For each macroblock, the variable length encoder unit produces a compressed representation of the quantised DCT coefficients (signal 424 from the quantisation unit) the macroblock mode, motion compensation mode and motion vectors (signal 416 from the motion estimation unit) and Qp (signal 418 from the rate control unit). The compressed macroblock is sent as the signal 420 to the output buffer 421.

The output buffer receives the compressed representation of each macroblock from the variable length encoder as signal 420. It then sends out the bits that it has received on a first come, first serve basis as the signal 422. A signal indicating the fullness of the output buffer is sent as signal 423 to the rate control unit.

The rate control decides the value of Qp for each macroblock. It will in general respectively increase or decrease the value of Qp for future macroblocks if the output buffer is respectively nearly full or nearly empty.

In "ISO-IEC/JTC1/SC29/WG11 Coded Representation of Picture and Audio Information: Test Model 5, Draft, 1993", a conventional motion estimation unit is described. We will now describe a motion estimation method similar to the method described in that reference. For each method of motion compensation (F/FR, F/FI, B/FR, B/FI, FB/FR, FB/FI), a candidate vector (or vector set) is chosen. The method that has the smallest "prediction error" is chosen as the method to use for that macroblock, and the candidate vector (or vector set) previously chosen for that method is the vector (or vector set) that will be used. A prediction error is a number that indicates the degree to which the predictive macroblock does not match the current macroblock (the macroblock being encoded). By way of example, a conventional motion estimation unit that always uses the "one-norm" of the difference macroblock as the prediction error is described. The one norm of a set of numbers is the sum of the absolute value of those numbers. Thus if we denote the pixel in row i and column j of a predictive macroblock as a(i,j) and the pixel in row i and column j of the current macroblock as c(i,j), then the one-norm of the difference macroblock, $\Delta_a$, is:

$$\Delta_a = \sum_{i=0}^{15} \sum_{j=0}^{15} |a(i,j) - c(i,j)|$$

For each method that does not use temporal interpolation (F/FR, F/FI, B/FR and B/FI), each vector (or vectors) in a given range are examined. For each vector (or vectors) the prediction error is computed. For each method, the vector or vector set that give the smallest prediction error is chosen as the candidate vector or vector set. For the FB/FR method, candidate vectors are the same vectors chosen as candidates for the F/FR and B/FR method. A separate computation is done to compute the prediction error for the FB/FR method with the given candidate vectors. For the FB/FI method, candidate vectors are the same vectors chosen as candidates for the F/FI and B/FI method. A separate computation is done to compute the prediction error for the FB/FI method with the given candidate vectors.

After a vector (or vector set) has been chosen for each method, the method and candidate vector (or set) with the smallest one-norm is chosen.

b. PREFERRED EMBODIMENT OF AN ENCODER

The present video encoder is an encoder of the form shown in FIG. 4 with a motion estimation unit as shown in FIG. 11. The operation of the motion estimation unit of FIG. 11 can be described as follows.

The video data is sent as signal 1102 to the memory 1104. The hierarchical field/frame computing engine 1108 reads video data stored in the memory as signal 1106 and, for each macroblock, computes the candidate vectors for F/FR, F/FI, B/FR and B/FI motion compensation methods, which are sent as signal 1101 to the interpolator and final decision maker 1114. The interpolator and final decision maker computes candidate motion vectors for the FB/FR and FB/FI methods and decides which motion compensation method to use.

The operation of an interpolator and final decision maker are conventional; e.g., the motion estimator in "ISO-IEC/JTC1/SC29/WG11 Coded Representation of Picture and Audio Information: Test Model 5, Draft, 1993" has an interpolator and final decision maker suitable for use with the motion estimation unit of FIG. 11.

The difference between the motion estimator shown in FIG. 11 and a conventional motion estimator, for example, the motion estimator in "ISO-IEC/JTC1/SC29/WG11 Coded Representation of Picture and Audio Information: Test Model 5, Draft, 1993", is that the motion estimator in FIG. 11 computes candidate motion vectors with a hierarchical field/frame computing engine (1108).

FIG. 5 is a more detailed block diagram of the hierarchical field/frame computing engine 1108. The video data (at full resolution) enters as signal 502, and goes to a memory device 504 (which stores the full resolution video data) and a scaler 506. The scaler performs field-based scaling of the input video to reduce its resolution, and outputs the resulting reduced resolution video data as signal 508. The reduced resolution video data provided by way of signal 508 is stored in a memory 510. (Field-based scaling means that each field is scaled to reduce its horizontal and/or vertical resolution, and the scaled fields are rearranged back into a frame of lower resolution.)

The field error computation unit 514 reads the reduced resolution video as the signal 512 from memory 510 and computes errors for different coarse vectors for field motion compensation mode and backward or forward macroblock mode (F/FI and B/FI motion compensation methods) for each macroblock. The vectors are referred to as coarse vectors because they are computed from reduced resolution data, so they do not describe the motion with as much precision or accuracy as vectors computed from the full resolution data. These errors and vectors are read as signal 516 by the field errors to frame errors unit 518, which computes, from the field errors, errors for different coarse motion vectors for frame motion compensation mode and backward or forward macroblock mode (F/FI and B/FI motion compensation methods) for each macroblock. In the preferred embodiment, the field errors to frame errors unit computes each frame error as the sum of the two field errors that are computed with data that correspond to the frame error. These errors and vectors (signal 520) as well as the field errors and vectors (signal 516) are read by the refine decision unit 522.

The refine decision unit 522 decides which coarse motion vectors to refine. For example, in one embodiment, the refine decision unit decides that, for each direction (forward for a P picture, forward and backward for a B picture), the coarse frame vector with the smallest error and for each of the top and bottom fields of each macroblock that coarse field vector with the smallest error will be refined. Data identifying the vectors to be refined are generated by the refine decision unit and then sent as signal 523 to the refine unit 525, which, by reading the full resolution pixel data from the memory 504 as signal 524 refines the coarse vectors, to produce the final candidate vectors as signal 526.

A first example of how the scaler works to perform field-based scaling can be seen by looking at FIGS. 7A and 7B. For this example, only horizontal scaling is performed. FIG. 7A shows a full resolution frame, and FIG. 7B shows the same frame scaled 4:1 horizontally. In this example, the scaling is done by averaging four pixels. The full resolution frame (7A) has 20 columns (A–X), whereas the reduced resolution frame (7B) has only five: the first is the average of columns A, B, C and D from FIG. 7A, the second is the average of columns E, F, G, H, and so on.

A second example of how the scaler performs field-based scaling can be seen by looking at FIGS. 8A and 8B. For this example, only vertical scaling is performed. FIG. 8A shows a full resolution frame, and FIG. 8B shows the same frame scaled 2:1 vertically. In this example, the scaling is done by averaging two pixels. The full resolution frame (8A) has 20 rows (A–X), whereas the reduced resolution frame (8B) has only ten: the first is the average of rows A and C from FIG. 8A, the second is the average of rows B and D, the third is the average of rows E and G, the fourth is the average of rows F and H, and so on. Note that in the reduced resolution frame (8B) the top field (odd rows) is formed by scaling data from the top field (odd rows) of the full resolution frame (8A). Similarly, in the reduced resolution frame (8B) the bottom field (even rows) is formed by scaling data from the bottom field (even rows) of the full resolution frame (8A).

FIGS. 9A and 9B show a reduced resolution reference frame and current macroblock where the scaling is done 2:1 horizontally and 2:1 vertically. FIG. 9A shows a reduced resolution reference frame of size 10×10 pixels (which means that the original frame was 20×20 pixels). FIG. 9B shows a reduced resolution current macroblock. Because full-resolution macroblocks are 16×16, the reduced resolution macroblock is 8×8. FIGS. 10A and 10B show the frame of FIG. 9A as two fields; FIG. 10A shows the top field, FIG. 10B shows the bottom field. FIGS. 10C and 10D show the macroblock of FIG. 9B as two fields of a macroblock; FIG. 10C shows the top field, and FIG. 10D shows the bottom field. FIGS. 9A, 9B, 10A, 10B, 10C and 10D will be used to give examples of the operation of the field error computation unit (514) and the field errors to frame errors unit (518).

Consider FIG. 10C, the top field of the macroblock. This region can be compared to eight similarly sized regions in the top field shown in FIG. 10A. The field error computation unit computes errors for each of these cases:

| Macroblock field | Top left corner of field reference block | Error |
| --- | --- | --- |
| Top | A0_0 | TT_0_0 |
| Top | A0_1 | TT_0_1 |
| Top | A0_2 | TT_0_2 |
| Top | A0_3 | TT_0_3 |
| Top | A2_0 | TT_1_0 |
| Top | A2_1 | TT_1_1 |
| Top | A2_2 | TT_1_2 |
| Top | A2_3 | TT_1_3 |

The field error computation unit also computes errors between the top macroblock field and the bottom reference field:

| Macroblock field | Top left corner of field reference block | Error |
| --- | --- | --- |
| Top | A1_0 | BT_0_0 |
| Top | A1_1 | BT_0_1 |
| Top | A1_2 | BT_0_2 |
| Top | A1_3 | BT_0_3 |
| Top | A3_0 | BT_1_0 |
| Top | A3_1 | BT_1_1 |
| Top | A3_2 | BT_1_2 |
| Top | A3_3 | BT_1_3 | the bottom macroblock field and the top reference field:

| Macroblock field | Top left corner of field reference block | Error |
|---|---|---|
| Bottom | A0_0 | TB_0_0 |
| Bottom | A0_1 | TB_0_1 |
| Bottom | A0_2 | TB_0_2 |
| Bottom | A0_3 | TB_0_3 |
| Bottom | A2_0 | TB_1_0 |
| Bottom | A2_1 | TB_1_1 |
| Bottom | A2_2 | TB_1_2 |
| Bottom | A2_3 | TB_1_3 | and the bottom macroblock field and the bottom reference field:

| Macroblock field | Top left corner of field reference block | Error |
|---|---|---|
| Bottom | A1_0 | BB_0_0 |
| Bottom | A1_1 | BB_0_1 |
| Bottom | A1_2 | BB_0_2 |
| Bottom | A1_3 | BB_0_3 |
| Bottom | A3_0 | BB_1_0 |
| Bottom | A3_1 | BB_1_1 |
| Bottom | A3_2 | BB_1_2 |
| Bottom | A3_3 | BB_1_3 |

For example, the error BT_0_1 is a measure of the difference between

| A1_1 | A1_2 | A1_3 | A1_4 | A1_5 | A1_6 | A1_7 | A1_8 |
| A3_1 | A3_2 | A3_3 | A3_4 | A3_5 | A3_6 | A3_7 | A3_8 |
| A5_1 | A5_2 | A5_3 | A5_4 | A5_5 | A5_6 | A5_7 | A5_8 |
| A7_1 | A7_2 | A7_3 | A7_4 | A7_5 | A7_6 | A7_7 | A7_8 | and

| B0_0 | B0_1 | B0_2 | B0_3 | B0_4 | B0_5 | B0_6 | B0_7 |
| B2_0 | B2_1 | B2_2 | B2_3 | B2_4 | B2_5 | B2_6 | B2_7 |
| B4_0 | B4_1 | B4_2 | B4_3 | B4_4 | B4_5 | B4_6 | B4_7 |
| B6_0 | B6_1 | B6_2 | B6_3 | B6_4 | B6_5 | B6_6 | B6_7 |

If, for example, errors are computed with the one norm, then BT_0_1 would be the sum of the absolute values of the corresponding values in the above blocks. The error TB_1_1 is a measure of the difference between

| A2_1 | A2_2 | A2_3 | A2_4 | A2_5 | A2_6 | A2_7 | A2_8 |
| A4_1 | A4_2 | A4_3 | A4_4 | A4_5 | A4_6 | A4_7 | A4_8 |
| A6_1 | A6_2 | A6_3 | A6_4 | A6_5 | A6_6 | A6_7 | A6_8 |
| A8_1 | A8_2 | A8_3 | A8_4 | A8_5 | A8_6 | A8_7 | A8_8 | and

| B1_0 | B1_1 | B1_2 | B1_3 | B1_4 | B1_5 | B1_6 | B1_7 |
| B3_0 | B3_1 | B3_2 | B3_3 | B3_4 | B3_5 | B3_6 | B3_7 |
| B5_0 | B5_1 | B5_2 | B5_3 | B5_4 | B5_5 | B5_6 | B5_7 |
| B7_0 | B7_1 | B7_2 | B7_3 | B7_4 | B7_5 | B7_6 | B7_7 |

These two errors can be combined to compute the error between the frame block (in the frame shown in FIG. 9A) that begins at location A1_1 and the (entire) macroblock (FIG. 9B). Indeed, the sum of the absolute pixels differences between is equal to the sum of BT_0_1 and TB_1_1. As mentioned, in the preferred embodiment, the field errors to frame errors unit computes each frame error as the sum of the two field errors that are computed with data that correspond to the frame error.

| A1_1 | A1_2 | A1_3 | A1_4 | A1_5 | A1_6 | A1_7 | A1_8 |
| A2_1 | A2_2 | A2_3 | A2_4 | A2_5 | A2_6 | A2_7 | A2_8 |
| A3_1 | A3_2 | A3_3 | A3_4 | A3_5 | A3_6 | A3_7 | A3_8 |
| A4_1 | A4_2 | A4_3 | A4_4 | A4_5 | A4_6 | A4_7 | A4_8 |
| A5_1 | A5_2 | A5_3 | A5_4 | A5_5 | A5_6 | A5_7 | A5_8 |
| A6_1 | A6_2 | A6_3 | A6_4 | A6_5 | A6_6 | A6_7 | A6_8 |
| A7_1 | A7_2 | A7_3 | A7_4 | A7_5 | A7_6 | A7_7 | A7_8 |
| A8_1 | A8_2 | A8_3 | A8_4 | A8_5 | A8_6 | A8_7 | A8_8 | and

| B0_0 | B0_1 | B0_2 | B0_3 | B0_4 | B0_5 | B0_6 | B0_7 |
| B1_0 | B1_1 | B1_2 | B1_3 | B1_4 | B1_5 | B1_6 | B1_7 |
| B2_0 | B2_1 | B2_2 | B2_3 | B2_4 | B2_5 | B2_6 | B2_7 |
| B3_0 | B3_1 | B3_2 | B3_3 | B3_4 | B3_5 | B3_6 | B3_7 |
| B4_0 | B4_1 | B4_2 | B4_3 | B4_4 | B4_5 | B4_6 | B4_7 |
| B5_0 | B5_1 | B5_2 | B5_3 | B5_4 | B5_5 | B5_6 | B5_7 |
| B6_0 | B6_1 | B6_2 | B6_3 | B6_4 | B6_5 | B6_6 | B6_7 |
| B7_0 | B7_1 | B7_2 | B7_3 | B7_4 | B7_5 | B7_6 | B7_7 |

So for frame block above the frame error is computed as BT_0_1+TB_1_1. A comprehensive list of how the frame errors for all matches in FIGS. 9A and 9B are computed follows:

| Upper Left Corner of Frame Block | Error Computed As |
|---|---|
| A0_0 | TT_0_0 + BB_0_0 |
| A0_1 | TT_0_1 + BB_0_1 |
| A0_2 | TT_0_2 + BB_0_2 |
| A0_3 | TT_0_3 + BB_0_3 |
| A1_0 | BT_0_0 + TB_0_0 |
| A1_1 | BT_0_1 + TB_0_1 |
| A1_2 | BT_0_2 + TB_0_2 |
| A1_3 | BT_0_3 + TB_0_3 |
| A2_0 | TT_2_0 + BB_2_0 |
| A2_1 | TT_2_1 + BB_2_1 |
| A2_2 | TT_2_2 + BB_2_2 |
| A2_3 | TT_2_3 + BB_2_3 |
| A3_0 | BT_2_0 + TB_3_0 |
| A3_1 | BT_2_1 + TB_3_1 |
| A3_2 | BT_2_2 + TB_3_2 |
| A3_3 | BT_2_3 + TB_3_3 |

In the preferred embodiment, the field errors to frame errors unit computes frame errors following the pattern evident from the above listing; the coarse field error for the top field of the reference frame predicting the top field of the current macroblock with an offset of x pixels horizontally and y pixels vertically is added to the coarse field error for the bottom field of the reference frame predicting the bottom field of the current macroblock with an offset of x pixels horizontally and y pixels vertically to get a frame error corresponding to an offset of x pixels horizontally and 2y pixels vertically, and the coarse field error for the bottom field of the reference frame predicting the top field of the current macroblock with an offset of x pixels horizontally and y pixels vertically is added to the coarse field error for the top field of the reference frame predicting the bottom field of the current macroblock with an offset of x pixels horizontally and y+1 pixels vertically to get a frame error corresponding to an offset of x pixels horizontally and 2y+1 pixels vertically.

As previously discussed, in one embodiment the refine decision unit decides that, for each direction (forward for a P picture, forward and backward for a B picture), the coarse frame vector with the smallest error and for each of the top and bottom fields of each macroblock that coarse field vector with the smallest error will be refined. In another embodiment, for each macroblock and each direction the refine decision unit refines only the frame vector or the field vector; the former is done if the field errors are substantially larger than the frame error (for example, they sum to 1.5 times the frame error or more) and the later is done otherwise.

The refine unit (525) works as follows. A coarse (field or frame) vector is refined by scaling the coarse vector to compensate for the fact that it was computed from scaled video data. For example, suppose the scaler (506) scales the video by a factor of 4:1 horizontally and 2:1 vertically. A coarse vector of x horizontal pixels and y vertical pixels is scaled to a vector of 4x horizontal pixels and 2y vertical pixels. Then the errors for vectors in a rectangular region centered at the scaled vector are computed; for the previous example, the refine unit could look at all vectors with horizontal component in the interval [4x−7, 4x+7] and vertical components in the interval [4y−3, 4y+3]. The vector with the smallest error is then chosen.

A block diagram for the encoder of the present invention connected to a decoder is shown in FIG. 12. The video encoder 1202 contains a motion estimation unit 1204 which contains a hierarchical field/frame computing engine 1206. The video encoder produces a compressed video stream 1208 which is sent to the video decoder 1210. The video decoder decompresses the video, and send the decompressed video as signal 1212 to the display or storage device 1214.

An overview of the motion estimation method used in the present invention is shown in FIG. 6. In step 602, the current and reference frame are input. In step 604, the reference frame is scaled to a smaller frame, and in step 606 the current frame is scaled to a smaller frame; in both cases, field-based scaling is used. In step 608 field-based errors are computed by comparing data in each field of each macroblock in the current frame to similarly sized regions in reference frames. In step 610 frame-based errors are computed from the field-based errors. In step 612, field vectors are chosen as refine candidates. In step 614, frame vectors are chosen as refine candidates. In step 616, decisions are made as to which of the refine candidates will be refined. In step 618, the refine candidates are refined.

The present invention can be embodied in an application specific integrated circuit (ASIC) or as program code executing on a general purpose computer.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

I claim:

1. A motion estimation unit, comprising:
   a scalar, for performing field-based scaling of a full resolution input video in at least one of the horizontal and vertical directions to form a reduced resolution video;
   a field error computation unit, coupled to the scalar, for computing field errors between regions in each field of a reduced resolution current frame and regions in each field of a reduced resolution reference frame;
   a field errors to frame errors unit, coupled to the field errors computation unit, for computing frame errors between regions in the reduced resolution current frame and regions in the reduced resolution reference frame;
   a refine decision unit, coupled to the field error computation unit and the field errors to frame errors computation unit, for selecting coarse vectors to refine; and
   a refine unit, coupled to the refine decision unit, for refining the coarse vectors selected by the refine decision unit using regions of the full resolution input video defined by said coarse vectors.

2. The motion estimation unit of claim 1 wherein the scaler scales the video in only the horizontal direction.

3. The motion estimation unit of claim 2 wherein the scaler scales the video by a four to one ratio in the horizontal direction.

4. The motion estimation unit of claim 1 wherein the scaler scales the video in both the horizontal and vertical directions.

5. The motion estimation unit of claim 1 wherein the field errors to frame errors unit computes frame errors as the sum of field errors.

6. The motion estimation unit of claim 1 further comprising: a frame memory, coupled to the scaler and the refine unit, the frame memory being connected to receive and store source video data including a picture to be encoded from a video source.

7. A method for motion estimation for use in conjunction with video encoding, comprising the steps of:
   field-based scaling a full resolution reference frame and at least one full resolution region of a current frame to form a reduced resolution reference frame and at least one reduced resolution region of the current frame;
   responsive to the scaling, computing, for the at least one reduced resolution region in the current frame, a first coarse inter-field error between a top field in the at least one reduced resolution region and a first region in the reduced resolution reference frame and a second course inter-field error between a bottom field in the at least one reduced resolution region and a second region in the reduced resolution reference frame;
   computing an inter-frame error as the sum of the first coarse inter-field error and the second coarse inter-field error;
   responsive to the computing of the inter-frame error and the first and second coarse inter-field errors, determining a selected motion vector having a minimum error; and
   responsive to the determining of the selected motion vector and a region of the at least one full resolution region of the current frame defined by the selected motion vector, refining the selected motion vector to form a refined motion vector that describes inter-frame motion of the at least one full resolution region of the current frame.

8. The method of claim 7 wherein the field based scaling comprises the step of scaling the video in only the horizontal direction.

9. The method of claim 7 wherein the field based scaling comprises the step of scaling the video in only the horizontal direction by a ratio of four to one.

10. The method of claim 7 wherein the field based scaling comprises the step of scaling the video in the horizontal and vertical directions.

11. An electronic method for performing motion estimation comprising the steps of:
   reducing resolution of full resolution interlaced frames with field based scaling to produce a plurality of reduced resolution frames;
   performing a first search on the reduced resolution frames by computing field motion errors between fields of a reduced resolution current frame and fields of a reduced resolution reference frame to obtain vectors that approximately describe inter-field motion between the fields of the reduced resolution current frame and the fields of the reduced resolution reference frame;

using the field motion errors to compute frame motion errors;

using the frame motion errors to obtain coarse vectors that approximately describe inter-frame motion; and refining the coarse vectors that approximately describe the inter-field motion and the vectors that approximately describe the inter-frame motion by performing a second search of regions of the full resolution interlaced frames defined by the coarse vectors to obtain more precise vectors.

12. The motion estimation unit of claim 1, wherein said scaler performs the scaling by reducing a resolution of the input video to provide scaled fields and rearranges the scaled fields into a frame of lower resolution than the input video.

13. The method of claim 7, wherein the field-based scaling step reduces a resolution of the one region of the current frame to provide scaled fields and rearranges the scaled fields into a frame of lower resolution than the current frame.

14. The method of claim 11, wherein the reducing step reduces a resolution of one region of each of the interlaced frames to provide scaled regions and rearranges the scaled regions into the plurality of the reduced resolution frames.

* * * * *